United States Patent
Labarre et al.

(10) Patent No.: US 10,072,202 B2
(45) Date of Patent: Sep. 11, 2018

(54) POLYMER COMPOSITION FOR INHIBITING THE FORMATION OF INORGANIC AND/OR ORGANIC DEPOSITS IN UNDERGROUND FORMATIONS

(71) Applicant: RHODIA OPERATIONS, Paris (FR)

(72) Inventors: Dominique Labarre, Neuilly sur Seine (FR); James Wilson, Coye la Foret (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/417,197

(22) PCT Filed: Jul. 26, 2013

(86) PCT No.: PCT/EP2013/065807
§ 371 (c)(1),
(2) Date: Jan. 26, 2015

(87) PCT Pub. No.: WO2014/016410
PCT Pub. Date: Jan. 30, 2014

(65) Prior Publication Data
US 2015/0166876 A1 Jun. 18, 2015

(30) Foreign Application Priority Data

Jul. 27, 2012 (FR) ...................... 12 02134

(51) Int. Cl.
*C09K 8/52* (2006.01)
*C09K 8/524* (2006.01)
*C08F 22/38* (2006.01)
*C08F 220/06* (2006.01)
*C09K 8/528* (2006.01)

(52) U.S. Cl.
CPC ............ *C09K 8/524* (2013.01); *C08F 22/385* (2013.01); *C08F 220/06* (2013.01); *C09K 8/52* (2013.01); *C09K 8/528* (2013.01); *C09K 2208/10* (2013.01); *C09K 2208/26* (2013.01)

(58) Field of Classification Search
CPC ........ C09K 2208/30; C09K 8/36; C09K 8/58; C09K 8/584; C09K 8/602; C09K 8/86; C09K 2205/22; C09K 2205/32; C09K 2208/08; C09K 2208/10; C09K 3/30; C09K 5/044; C09K 8/035; C09K 8/32; C09K 8/42; C09K 8/46; C09K 8/52; C09K 8/528; C09K 8/594; C09K 8/62; C09K 8/66; C09K 8/665; C09K 8/68; C09K 8/685; C09K 8/72; C09K 8/76; C09K 8/80; C09K 8/84; C09K 8/426; E21B 43/16; E21B 47/06; E21B 47/00; E21B 33/124; E21B 34/10; E21B 34/14; E21B 41/0092; E21B 43/14; E21B 43/26; E21B 43/267; E21B 2034/007; E21B 34/06; E21B 34/12; E21B 41/00; E21B 43/121; E21B 7/064

See application file for complete search history.

(56) References Cited

U.S. PATENT DOCUMENTS

| 5,399,270 A | 3/1995 | Hen | |
| 6,586,097 B1* | 7/2003 | Pascault | ..................... C08F 2/14 |
| | | | 428/402 |
| 7,943,067 B2* | 5/2011 | Kazakov | ................ A61K 9/127 |
| | | | 264/4 |
| 2006/0106178 A1* | 5/2006 | Destarac | ................... C08F 4/00 |
| | | | 526/222 |
| 2010/0093874 A1 | 4/2010 | Monin et al. | |

FOREIGN PATENT DOCUMENTS

| WO | WO 93/04264 A1 | 3/1993 |
| WO | WO 03/106810 A1 | 12/2003 |

OTHER PUBLICATIONS

W. Blackburn et al., "Size-controlled synthesis of monodisperse core/shell", Colloid and Polymer Science, 2008, 286(5), 563-569.*
N. Singh et al., "Synthesis of multifunctional nanogels using a protected macromonomer approach", Colloid and Polymer Science, 2008, 286(8-9), 1061-1069.*
L. Qian el al., "Hydroxypropylcellulose templated synthesis of surfactant-free poly(acrylic acid) nanogels in aqueous media", Carbohydrate Polymers, 2012, 87(4), 2648-2654.*
N. Singh, L.A. Lyon, Synthesis of multifunctional nanogels using a protected macromonomer approach, Colloid Polym Sci., 2008, 286, 1061-1069.*
W.H. Blackburn, L.A. Lyon, Size-controlled synthesis of monodisperse core/shell nannogels, Colloid Polym Sci., 2008, 286, 563-569.*
Q. Liao, Q. Shao, H. Wang, G. Qiu, X. Lu, Hydroxypropylcellulose templated synthesis of surfactant-free poly(acrylic acid) nanogels on aqueous media, Carbohydrate Polymers, 2012, 87, 2648-2654.*
https://en.wikipedia.org/w/index.php?title= Hydrodynamic_ radius &printable=yes downloaded on Jan. 19, 2016.*
Blackburn, William H., et al—"Size Controlled Synthesis of Monodisperse Core/Shell Nanogels", 2008, Colloid Polym Science, vol. 286, Issue No. 5, pp. 563-569; 18 pgs.
Singh, Neetu, et al—"Synthesis of Multifunctional Nanogels Using a Protected Macromonomer Approach" 2008, Colloid Polym Science, vol. 286, Issue Nos., 8-9, pp. 1061-1069; 20 pgs.
Liao, Qian, et al —"Hydroxypropylcellulose template synthesis of surfactant-free poly(acrylic acid) nanogels in aqueous media", 2012, Carbohydrate Polymers, vol. 87, Issue No. 4, pp. 2648-2654; 7 pgs.

* cited by examiner

Primary Examiner — Kumar R Bhushan

(57) ABSTRACT

The invention relates to compositions for inhibiting the formation of deposits in underground formations such as oil wells, comprising, in a solvent medium, polymers P resulting from the radical copolymerization, preferably controlled and in solution, of a mixture including: monomers having an ethylenically unsaturated structure, selected from monomers that form, by polymerization, a polymer that has an effect of inhibiting the formation of organic and/or inorganic deposits; and polyethylenically unsaturated, cross-linking monomers carrying at least one group that can be cleaved between two ethylene unsaturations, said polymers P being present in the solvent in the form of dispersed nanogels.

15 Claims, No Drawings

POLYMER COMPOSITION FOR INHIBITING THE FORMATION OF INORGANIC AND/OR ORGANIC DEPOSITS IN UNDERGROUND FORMATIONS

CROSS-REFERENCE TO RELATED APPLICATIONS

The present application is a U.S. national stage entry under 35 U.S.C. § 371 of International Application No. PCT/EP2013/065807 filed Jul. 26, 2013, which claims priority to French Application No. 1202134 filed on Jul. 27, 2012, the whole content of this application being herein incorporated by reference for all purposes.

The present invention relates to compositions for providing gradual release of agents of the type that inhibit the formation of inorganic or organic deposits (in particular scale inhibitors) in underground formations such as hydrocarbon reservoirs.

During the extraction of oil from a hydrocarbon reservoir (oil reservoir such as a consolidated or unconsolidated rock formation, or a sand, for example), various factors can induce the formation of deposits, the formation of which is important to inhibit in order to prevent phenomena of obstruction of the underground formation (rock and/or well), which otherwise result in a slowing or even stopping of production. Various types of deposits can form in a hydrocarbon reservoir, such as scale (essentially inorganic deposits based on calcium carbonate, barium sulfate, strontium sulfate, calcium sulfate and/or calcium fluoride, in particular) or else asphaltene or wax deposits, or alternatively methane hydrate deposits.

A method commonly used to try to limit the formation of deposits of this type consists in injecting under pressure, into the underground formation, an aqueous composition comprising inhibitors, typically according to a step termed a "squeeze" step. One difficulty during the implementation of steps of this type is that, in general, only a small amount of injected inhibitors is effective in providing the desired inhibition effect, in particular because a large part of the agents injected is immediately removed in the stream of production fluids during restart of the well following the "squeeze" step. This removal of a large part of the agents introduced has in particular a negative impact in terms of costs. In addition, more fundamentally, it creates limited inhibitor contents in the underground formation, which can prove to be too low to provide the desired inhibition effect, which often requires maintaining a minimum inhibitor concentration in the formation.

In order to attempt to overcome the abovementioned difficulties, various methods have been proposed, in which it is sought to precipitate the inhibitor in the rock, for example using the methods described in EP 599 832 or U.S. Pat. No. 5,399,270. This type of method admittedly limits to a certain extent the loss of inhibiting agent, but the precipitation generally takes place in an uncontrolled manner and can, in certain cases, induce degradation of the underground formation (typically blocking of the pores of the oil-producing rock).

A more specific method that has been proposed, and that is described in particular in WO 03/106810, consists in using inhibitors in the form of microgels, obtained by reacting inhibitors of carboxylic acid type with polyols providing crosslinking by formation of multiple ester bonds. Once again, the size of the microgels formed is not controlled, and it results in the formation of objects of relatively large sizes (of about a few microns), which, once again, are likely to damage the underground formation, sometimes irreversibly.

An objective of the present invention is to provide a novel method for obtaining the advantages of the abovementioned methods, but while avoiding the drawbacks thereof. In other words, an objective of the present invention is to provide the means for inhibiting the rapid loss of inhibitors after injection thereof into an underground formation, but without, in order to do this, having to run the risk of damaging the underground formation, and in particular the risk of blocking the pores of the rock.

To this effect, the present invention proposes using polymeric inhibitors in the form of polymer chains which are crosslinked with one another by means of crosslinking agents which tend to gradually degrade under the temperature and/or pH conditions of the underground formation where they are introduced, these crosslinked chains having specifically the form of objects of very small size (nanogels), thereby limiting the blocking phenomena encountered with the abovementioned methods proposed in the prior art.

More specifically, according to a first aspect, a subject of the present invention is a composition comprising, in a solvent medium S (typically in an aqueous solvent, for example water or a water/alcohol mixture, which is optionally additivated), chemically crosslinked polymers P resulting from the radical copolymerization of a mixture of monomers including:

ethylenically unsaturated monomers m1, also denoted hereinafter "structural monomers", selected from monomers which form by polymerization a polymer having an effect of inhibiting organic and/or inorganic deposit formation; and polyethylenically unsaturated monomers m2, also denoted hereinafter "crosslinking monomers", bearing at least one group which is cleavable between two ethylenic unsaturations, and where said polymers P are present in the solvent medium S in the form of dispersed objects having sizes of less than 1 micron, typically less than 500 nm, and more preferentially less than 100 nm (these objects being denoted in the present description by the generic term "nanogels").

For the purposes of the present invention, the term "cleavable group" is intended to mean an at least divalent group, present in a chain, which is stable at least under certain pH and temperature conditions, but which is lysed, inducing a chain cleavage, when it is subjected to a temperature above a limiting temperature (thermal cleavage) and/or when it is placed under specific pH conditions (pH-induced cleavage). The lysis of the cleavable group(s) present on the chain is preferably carried out irreversibly and without lysing the rest of the chain.

The polymers P present in the compositions of the invention comprise such cleavable groups, which are introduced into the chains and ensure crosslinking thereof via the use of the monomers m2. The cleavable groups present on the polymers P are generally identical to those present on the monomers m2 and they are typically -ester-; -amide-; -ether-; -ether phosphate-; alternatively -ether sulfate-divalent groups. According to one advantageous embodiment, they are ester or amide groups, in particular an ester function. Generally, the polymers P are synthesized under pH and temperature conditions where said cleavable groups are stable. Moreover, the monomers m1 preferably do not bear cleavable groups.

In the polymers P, the cleavable groups all constitute "fragilities" which induce a gradual loss of the crosslinking when the polymers are subjected to cleavage-inducing temperature and/or pH conditions. The temperature conditions required are typically obtained when a composition of the invention is injected into an underground formation and the pH conditions may be obtained at any time, as required, by injection of a base or of an acid so as to obtain the cleavage pH.

The compositions according to the invention thus comprise polymers in a crosslinked form, thereby giving them better retention in the underground formation than polymers in noncrosslinked form. This crosslinking makes it possible, as a result, to retain a considerable part of the polymers in the formation by inhibiting the premature departure thereof before they can provide the desired effect of inorganic or organic deposit formation inhibition.

Because of the presence of the cleavable group, this crosslinking of the polymers P is, however, temporary and, through gradual cleavage, the polymers P introduced into an underground formation are thus capable of continuously releasing over time polymer chains suitable for providing an effect of inorganic or organic deposit formation inhibition, as required, by adjusting the pH in the underground formation, for example by coinjection of a base or of an acid. Schematically, under the cleavage conditions, the crosslinking-monomer-based chains gradually disappear, to be replaced by noncrosslinked or very sparingly crosslinked polymers.

The method of the invention makes it possible, depending on the temperature and pH conditions prevailing in the underground formation where the use of the composition is envisioned, to adapt the polymer used, so as to obtain the desired release profile. The release rate can be adapted by adjusting the nature of the cleavable group (the more fragile the group is, the more rapidly it will be released) and the number of crosslinking monomers in the polymer (the more of these crosslinking monomers there are, the lower the release rate).

Moreover, specifically, the polymers according to the invention are in the form of objects of very small size, less than 100 nm, which will be denoted in the present description by the generic term "nanogels". This specific use of nanogels, much smaller in size than the crosslinked objects proposed in the prior art methods (much smaller in size than the microgels of WO 03/106810, in particular) have the advantage of inducing many fewer underground formation degradation phenomena (the risks of blocking the oil-producing rock are in particular greatly reduced). The size to which reference is made here is the average hydrodynamic diameter of the polymers in the composition as measured by dynamic light scattering or else the average radius of gyration of the polymers in the composition, measured by static light scattering. According to one particularly advantageous embodiment, in a composition according to the invention, the polymers P are present in the form of objects having a radius of gyration of less than 100 nm, preferably less than 75 nm, for example between 1 and 50 nm. These very small sizes are easily attainable by radical polymerization of the monomers m1 and m2. This size may be even further controlled by using a controlled radical polymerization carried out in the presence of a control agent.

Preferably, the polymers P are obtained via a radical polymerization of the monomers m1 and m2 which is specifically carried out in solution (the monomers are dissolved in a solvent in which the polymers formed are soluble). Where appropriate, the radical solution polymerization is advantageously carried out using the solvent medium S of the composition of the invention (typically water or a water/alcohol mixture, which is optionally additivated) as polymerization solvent, thereby making it possible to directly obtain the composition resulting from the polymerization. More generally, use is preferably made of monomers m1 and m2 which are soluble in the solvent medium S and which result in the formation of polymers which are themselves also soluble in the solvent medium S.

Typically, the solvent medium S is aqueous and monomers m1 and m2 which result in the formation of water-soluble polymers are used. In this case, it is preferable not to use monomers such as NIPAM, which are water-soluble, but which form polymers that precipitate in water during their formation. Thus, according to one advantageous embodiment, the monomers m1 and m2 are different than NIPAM and, more generally, the monomers m1 and m2 are preferably monomers which are not capable of forming polymers which are water-insoluble, at least under certain temperature conditions. In particular, the monomers m1 and m2 are preferably not monomers capable of forming polymers having an LCST (lower critical solution temperature).

According to one preferential embodiment, the polymers P result from a controlled radical polymerization of the monomers m1 and m2, carried out in the presence of a control agent. According to this particularly advantageous embodiment, the nanogels obtained are, schematically, based on polymer chains of poly (m1) type, namely polymers (homo- or copolymers) based on the structuring monomers m1, crosslinked with one another as in the most general case (taking into account the use of the monomers m2), but which also have the specificity, according to this particular mode, of all having approximately identical lengths (taking into account the presence of the control agent). The implementation of a controlled radical polymerization makes it possible to very finely adjust the delivery profile and the anti-scale-type inhibition effect desired according to the invention.

According to one particularly advantageous embodiment, the polymers P result from a controlled radical polymerization of the monomers m1 and m2, carried out in the presence of a control agent and also performed in solution, preferably under the abovementioned conditions.

According to another aspect, a subject of the present invention is a preparation process which is particularly suitable for synthesizing compositions of the abovementioned type with the small size desired for microgels. This process comprises a step (E), preferably carried out in solution, in which the following are brought together:
  ethylenically unsaturated monomers (m1) of the abovementioned type;
  polyethylenically unsaturated monomers (m2) bearing a cleavable function, of the abovementioned type;
  a source of free radicals; and
  a polymerization control agent,
with a degree of crosslinking, defined by the molar ratio m2/(m1+m2), corresponding to the amount of monomers m2 relative to the total amount of monomers, of between 0.05% and 25%, typically between 0.1% and 15%, for example between 0.5% and 10%.

Preferably, in step (E), the amount of control agent relative to the total amount of monomers (control agent)/(m1+m2) is between 0.1% and 10%, preferably between 0.15% and 5%.

When step (E) is carried out in solution, it is carried out in a solvent medium (advantageously the solvent medium S of the composition of the invention) in which the monomers m1 and m2, the source of free radicals and the control agent are all soluble, typically in an amount of at least 1 g/l in the solvent under the conditions of step (E).

According to yet another aspect, a subject of the invention is the use of the abovementioned composition as an inhibitor of the formation of inorganic or organic deposits, such as scale, in an underground formation in the context of an oil extraction. To do this, the composition according to the invention is injected into an underground formation, typically during a "squeeze" step of the abovementioned type.

Various preferential aspects and embodiments of the invention will now be described in greater detail.

Structuring Monomers (m1)

Any monomer of which the resulting polymer is known to induce an effect of inhibition of the formation of inorganic and/or organic deposits such as scale can be used as structuring monomer m1 according to the invention.

In particular, according to one advantageous embodiment, the monomers m1 can typically be acrylic acid monomers, which result in the formation of poly(acrylic acid), well known as an inhibitor of the formation of barium sulfate scale.

More generally, use may be made, as monomers m1 according to the invention, of (in particular anhydrides, esters and chlorinated derivatives such as acid chlorides), these acids and derivatives which are of use as monomers m1 according to the invention typically being selected from:
  acrylic acid, methacrylic acid and ethacrylic acid;
  α-chloroacrylic acid, crotonic acid, maleic acid, maleic anhydride, itaconic acid, citraconic acid, mesaconic acid, glutaconic acid, aconitic acid, fumaric acid;
  bromoacrylic acid, bromomethylacrylic acid, α-cyanoacrylic acid, β-methylacrylic acid, α-phenylacrylic acid, β-acryloxypropionic acid, β-carboxyethylacrylic acid (oligomerized acrylic acid such as the one sold under the name Sipomer B-CEA), sorbic acid, α-chlorosorbic acid, angelic acid, cinnamic acid, p-chlorocinnamic acid, β-styrylacrylic acid, itaconic acid, maleic acid, vinylbenzoic acid, propylacrylic acid, acetamidoacrylic acid, maleimidopropylcarboxylic acid;
  monoesters of monoethylenically unsaturated dicarboxylic acid, where the monoethylenically unsaturated dicarboxylic acid preferably comprises from 4 to 10 carbon atoms, for example 4, 5 or 6;
  monomethylated maleic acid;
  vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, isopropenylphosphonic acid;
  allylphosphonic acids, diallylaminomethylenephosphonic acid;
  mixtures of two or more of these acids or acid derivatives.

Compounds which are advantageous as monomers m1 are acrylic acid, methacrylic acid, ethacrylic acid, α-chloroacrylic acid, bromoacrylic acid, bromomethylacrylic acid, α-cyanoacrylic acid, β-methylacrylic acid, α-phenylacrylic acid, β-acryloxypropionic acid, β-carboxyethylacrylic acid (oligomerized acrylic acid, and in particular of the abovementioned Sipomer B-CEA type), cinnamic acid, itaconic acid, maleic acid, glutaconic acid, aconitic acid, fumaric acid, vinylbenzoic acid, propylacrylic acid, maleimidopropylcarboxylic acid; and mixtures of these compounds.

When the monomers m1 contain acid groups, they may be used during their polymerization in free acid form (—COOH for example) or else in a totally or partially neutralized form (carboxylate groups or mixture of carboxylates and —COOH, for example).

As monomers m1, use may also be made of (alone or optionally as a mixture with the abovementioned compounds):
  esters of α,β-ethylenically unsaturated monocarboxylic or dicarboxylic acid and of alkanediol, such as, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and mixtures thereof;
  N-vinyllactams or N-vinyllactam derivatives, typically selected from N-vinylpyrrolidone, vinylpiperidone, vinylcaprolactam, and mixtures thereof;
  open-chain vinylamide compounds, such as, for example, vinylformamide, vinyl-N-methylformamide, N-vinylacetamide, N-vinyl-N-methylacetamide, N-vinyl-N-ethylacetamide, N-vinylpropionamide, N-vinyl-N-methylpropionamide, vinylbutyramide, and mixtures thereof;
  esters of α,β-ethylenically unsaturated monocarboxylic or dicarboxylic acid with amino alcohols, selected in particular from N,N dimethylaminomethyl, N,N-dimethylaminoethyl, N,N-diethylaminoethyl, N,N-dimethylaminopropyl, N,N-diethylaminopropyl and N,N-dimethylaminocyclohexyl acrylates and methacrylates, and mixtures of these esters;
  amides of α,β-ethylenically unsaturated monocarboxylic or dicarboxylic acids with diamines having at least one primary or secondary amine group, such as, for example, N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, or alternatively N,N-(diethylamino)ethylacrylamide, and mixtures thereof;
  amides or derivatives thereof, including in particular hydroxyethylacrylamide, diacetone acrylamide, N-morpholine acrylamide, acrylamidopropyltrimethylammonium chloride, diethylacrylamide, N-isopropylacrylamide, propylacrylamide, and mixtures thereof;
  N,N-diallylamines and/or N,N-diallylalkylamines (where the alkyl is preferably an alkyl comprising from 1 to 4 carbon atoms) and/or the acid addition salts thereof and the quaternized products thereof, for example N,N-diallyl-N-methylamine and/or the compounds (in particular chlorides and bromides) of N,N-diallyl-N,N-dimethylammonium;
  vinyl- and/or allyl-substituted nitrogen heterocycles, such as vinylimidazole and vinyl-1,2-methylimidazole;
  vinyl- and/or allyl-substituted heteroaromatic compounds, such as, for example, 2- and 4-vinylpyridine, 2- and 4-allylpyridine, and salts thereof;
  sulfobetaine ester amides such as those described, for example, in application US 2010/0093874.

Monomers m1 which are very suitable according to the invention, used in the examples given hereinafter, are acrylic acid, sodium vinyl sulfonate, styrenesulfonic acids and/or vinylphosphonic acid.

Crosslinking Monomers (m2)

They are typically monomers bearing two ethylenically unsaturated groups, separated by a spacer group including at least one cleavable group of the abovementioned type.

They may in particular be monomers of formula $H_2C=C-A-C=CH_2$, where A denotes a saturated or unsaturated, linear or branched and optionally totally or partially cyclized, divalent hydrocarbon-based chain, for example an alkylene or alkenylene chain, said chain including a cleavable group.

Suitable crosslinking monomers include in particular acrylic esters, methacrylic esters, diallyl ethers and divinyl ethers of alcohols bearing at least two hydroxyl groups (hereinafter denoted "dihydric" alcohols, this term not being intended to denote herein only alcohols bearing exactly two —OH groups, but more broadly any alcohol bearing at least two OH groups, it being possible for the OH groups of these alcohols to be totally or partially etherified or esterified).

Suitable monomers m2 thus include, for example, acrylic esters, methacrylic esters, diallyl ethers and divinyl ethers of the following dihydric alcohols:

1,2-ethanediol; 1,2-propanediol; 1,3-propanediol; 1,2-butanediol; 1,3-butanediol; 2,3-butanediol; 1,4-butanediol; but-2-ene-1,4-diol; 1,2-pentanediol; 1,5-pentanediol; diethylene glycol; triethylene glycol; tetraethylene glycol; dipropylene glycol; tripropylene glycol; tetrapropylene glycol; 3-thiapentane-1,5-diol;

polyethylene glycols and/or polypropylene glycols; and polytetrahydrofurans, these polyols having a molecular weight preferably of between 200 and 10 000;

mixtures of two or more of these alcohols.

The expression "polyethylene glycols and/or polypropylene glycols" is intended to mean herein the group consisting of ethylene oxide homopolymers (polyethylene glycols), propylene oxide homopolymers (polypropylene glycols), and copolymers based on ethylene oxide and on propylene oxide, in particular block copolymers comprising at least one polyethylene oxide block and at least one polypropylene oxide block.

Dihydric alcohols which are very suitable in the abovementioned esters and ethers are trimethylolpropane, glycerol, pentaerythritol, 1,2,5-pentanetriol, 1,2,6-hexanetriol, sorbitan, or else sugars, such as, inter alia, sucrose, glucose or mannose.

These dihydric alcohols may advantageously be used in the form of ethoxylates or propoxylates, namely respectively after reaction with ethylene oxide or propylene oxide.

Alternatively, use may be made of glycidyl ethers, which are obtained by reacting polyhydric alcohols with epichlorohydrin.

As suitable monomers m2, mention may also be made of:
N-allylamines comprising at least two amine functions. Amines of this type include in particular 1,3-diaminopropane or 1,4-diaminobutane;
amides formed from these allylamines comprising at least two amine functions with unsaturated carboxylic acids, such as acrylic acid, methacrylic acid, itaconic acid or maleic acid.

Monomers m2 which are very suitable according to the invention, used in the examples given hereinafter, are diethylene glycol diacrylate (termed "DiEGDA") and N,N'-methylenebisacrylamide (termed "MBA").

More generally, as monomers m2, use may be made of acrylamido or methacrylamido compounds, in particular N,N'-methylenebisacrylamide, N,N'-methylenebismethacrylamide, glyoxal bisacrylamide, or diacrylamidoacetic acid.

Controlled Radical Polymerization: Control Agent

Step (E) of the process of the present invention, which makes it possible to synthesize the polymers P by controlled radical polymerization, is specifically carried out in the presence of a control agent.

In this context, any agent known per se as suitable for controlling the radical polymerization of the monomers (m1) and (m2) can be used in step (E).

According to one particularly advantageous embodiment, the control agent used in step (E) is a compound bearing a thiocarbonylthio group —S(C=S)—. According to one particular embodiment, the control agent may bear several thiocarbonylthio groups. It may optionally be a polymer chain bearing such a group.

Thus, this control agent may, for example, correspond to formula (I) below:

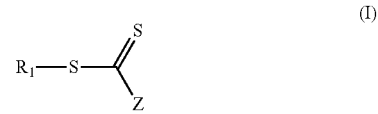

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted carboxyl, acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups of hydrophilic or ionic nature such as alkali metal salts of carboxylic acids, alkali metal salts of sulfonic acid, polyalkylene oxide chains (PEO, POP), cationic substituents (quaternary ammonium salts), R representing an alkyl or aryl group, or a polymer chain.

The optionally substituted alkyl, acyl, aryl, aralkyl or alkyne groups generally contain 1 to 20 carbon atoms, preferably 1 to 12 and more preferentially 1 to 9 carbon atoms. They may be linear or branched. They may also be substituted with oxygen atoms, in particular in the form of esters or sulfur or nitrogen atoms.

Among the alkyl radicals, mention may be made in particular of the methyl, ethyl, propyl, butyl, pentyl, isopropyl, tert-butyl, pentyl, hexyl, octyl, decyl or dodecyl radical.

The alkyne groups are radicals generally containing from 2 to 10 carbon atoms, and contain at least one acetylenic unsaturation, such as the acetylenyl radical.

The acyl group is a radical generally containing from 1 to 20 carbon atoms with a carbonyl group.

Among the aryl radicals, mention may be made in particular of the phenyl radical, optionally substituted in particular with a nitro or hydroxyl function.

Among the aralkyl radicals, mention may be made in particular of the benzyl or phenethyl radical, optionally substituted in particular with a nitro or hydroxyl function.

When $R_1$ or Z is a polymer chain, this polymer chain may be derived from a radical or ionic polymerization or derived from a polycondensation.

Advantageously, compounds bearing a xanthate —S(C=S)O—, trithiocarbonate, dithiocarbamate or dithiocarbazate function, for example bearing an O-ethyl xanthate function of formula —S(C=S)OCH$_2$CH$_3$, are used as control agent for step (E).

Xanthates prove to be most particularly advantageous, in particular those bearing an O-ethyl xanthate function —S(C=S)OCH$_2$CH$_3$, such as O-ethyl-S-(1-methoxycarbonylethyl)xanthate (CH$_3$CH(CO$_2$CH$_3$))S(C=S)OEt manufactured by Rhodia under the name Rhodixan® A1.

The use of a control agent in the polymerization reaction makes it possible to finely control the size of the polymer chains and to synthesize polymer chains which are all of approximately identical size and morphology, thereby making it possible to very finely and very precisely modify the properties of the nanogel.

Controlled Radical Polymerization: Source of Free Radicals

Any source of free radicals which is known per se as being suitable for processes for polymerizing the selected monomers m1 and m2 may be used in step (E) of the process of the invention.

The radical polymerization initiator may, for example, be selected from the following initiators:
  hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, or ammonium persulfate,
  azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutyramidine)dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)-2-hydroxyethyl]propionamide, 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide)dihydrate, redox systems comprising combinations such as:
  mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars,
  alkali metal or ammonium persulfates, perborate or perchlorate in combination with an alkali metal bisulfite, such as sodium metabisulfite, and reducing sugars, and
  alkali metal persulfates in combination with an arylphosphinic acid, such as benzenephosphonic acid and the like, and reducing sugars.

According to one advantageous embodiment, use may be made of a radical initiator of redox type, which has the advantage of not requiring heating of the reaction medium (no thermal initiation).

Thus, the source of free radicals that is used can typically be selected from the redox initiators conventionally used in radical polymerization, typically not requiring heating for thermal initiation thereof. It is typically a mixture of at least one water-soluble oxidizing agent with at least one water-soluble reducing agent.

The oxidizing agent present in the redox system may be selected, for example, from peroxides such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system may typically be selected from sodium formaldehyde sulfoxylate (in particular in dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:
  mixtures of water-soluble persulfates with water-soluble tertiary amines,
  mixtures of water-soluble bromates (for example alkali metal bromate) with water-soluble sulfites (for example alkali metal sulfites),
  mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars,
  alkali metal or ammonium persulfates, perborate or perchlorate in combination with an alkali metal bisulfite, such as sodium metabisulfite, and reducing sugars, and
  alkali metal persulfates in combination with an arylphosphinic acid, such as benzenephosphonic acid and the like, and reducing sugars.

An advantageous redox system comprises (and preferably consists of) for example a combination of ammonium persulfate and sodium formaldehyde sulfoxylate.

The examples hereinafter illustrate the present invention, and the following abbreviations will be used in said examples:
  AA Acrylic Acid
  NaSS Sodium StyreneSulfonate
  VPA VinylPhosphonic Acid
  DiEGDA DiEthylene Glycol DiAcrylate
  MBA N,N'-MethyleneBisAcrylamide Part 1: Polymer Synthesis Examples 1 to 9 below describe the protocol used to synthesize various polymers (control polymers and polymers in the form of "nanogels" according to the invention). After each polymerization, the final solution was analyzed by the "Gel Permation Chromatography-Multi Angle Laser Light Scattering" (GPC-MALLS) method which makes it possible to measure the weight-average molecular weight (Mw) of the species present.

The conditions used for the GPC-MALLS are the following:
- A set of Aquagel-OH Mixed (3*(150*7.5 mm)) columns
- stationary phase: styrene/divinylbenzene which has been crosslinked
- PAA special mobile phase: buffer solution at pH=7: 100% water, 100 mM NaCl, 25 mM $NaH_2PO_4$, 25 mM $Na_2HPO_4$, 100 ppm $NaN_3$
- an RI refractometric detector (Agilent 1100)
- a MALLS Mini Dawn light scattering detector

EXAMPLE 1

Synthesis of an AA-Based Homopolymer (Comparative)

The following are introduced, at ambient temperature, into a 250 ml three-necked round-bottomed flask surmounted by a reflux condenser and equipped with a magnetic stirrer:
- 2.061 g of O-ethyl-S-(1-methoxycarbonyl ethyl) xanthate, $(CH_3CH(CO_2CH_3))S(C\!=\!S)OEt$, Rhodixan A1 manufactured by Rhodia
- 9.28 g of deionized water
- 9.28 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.37 g of a solution containing 10% by weight of initiator V50 are then added all at once. Immediately following this, 87.71 g of a solution containing 51% by weight of acrylic acid are continuously added over the course of 3 hours. Simultaneously, 50 g of a solution containing 13.1 g of a solution containing 10% by weight of initiator V50 and 36.9 g of deionized water are continuously added over the course of 3 h 10. Once the addition of the reagents is complete, the reaction medium is maintained at 70° C. with stirring for 1 hour. The heating is then stopped and the reaction medium is allowed to reach ambient temperature before discharging it.

The molar mass measured by $^1$H NMR is 8761 g/mol. The solids content (115° C., 1 h) is 34.6 w/w %. The degree of conversion measured by HPLC is 100%. The average molar mass measured by GPC-MALLS is 5200 g/mol.

EXAMPLE 2

Synthesis of an AA-Based Homopolymer (Comparative)

The following are introduced, at ambient temperature, into a 250 ml three-necked round-bottomed flask surmounted by a reflux condenser and equipped with a magnetic stirrer:
- 1.339 g of O-ethyl-S-(1-methoxycarbonyl ethyl)xanthate, $(CH_3CH(CO_2CH_3))S(C\!=\!S)OEt$, Rhodixan A1 manufactured by Rhodia
- 6.02 g of deionized water
- 6.02 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

2.84 g of a solution containing 10% by weight of initiator V50 are then added all at once. Immediately following this, 92.02 g of a solution containing 49% by weight of acrylic acid are continuously added over the course of 3 hours. Simultaneously, 50 g of a solution containing 8.51 g of a solution containing 10% by weight of initiator V50 and 41.5 g of deionized water are continuously added over the course of 3 h 10. Once the addition of the reagents is complete, the reaction medium is maintained at 70° C. with stirring for 1 hour. The heating is then stopped and the reaction medium is allowed to reach ambient temperature before discharging it.

The molar mass measured by $^1$H NMR is 11 691 g/mol. The solids content (115° C., 1 h) is 35.1 w/w %. The degree of conversion measured by HPLC is 100%. The average molar mass measured by GPC-MALLS is 9100 g/mol.

EXAMPLE 3

Synthesis of an AA-Based Nanogel

The following are introduced, at ambient temperature, into a 250 ml three-necked round-bottomed flask surmounted by a reflux condenser and equipped with a magnetic stirrer:
- 2.061 g of O-ethyl-S-(1-methoxycarbonyl ethyl)xanthate, $(CH_3CH(CO_2CH_3))S(C\!=\!S)OEt$, Rhodixan A1 manufactured by Rhodia
- 9.3 g of deionized water
- 9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 107.1 g of an aqueous solution containing 45 g of acrylic acid, 10.7 g of diethylene glycol diacrylate and 51.4 g of deionized water are continuously added over the course of 3 hours. Simultaneously, 60 g of a solution containing 13.1 g of a solution containing 10% by weight of initiator V50 and 46.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it.

The solids content (115° C., 1 h) is 26.5 w/w %. The degree of acrylic acid conversion measured by HPLC is 100%. The average molar mass measured by GPC-MALLS is 144 400 g/mol.

EXAMPLE 4

Synthesis of an AA-Based Nanogel

The following are introduced, at ambient temperature, into a 250 ml three-necked round-bottomed flask surmounted by a reflux condenser and equipped with a magnetic stirrer:
- 1.190 g of O-ethyl-S-(1-methoxycarbonyl ethyl)xanthate, $(CH_3CH(CO_2CH_3))S(C\!=\!S)OEt$, Rhodixan A1 manufactured by Rhodia
- 5.4 g of deionized water
- 5.4 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

2.52 g of a solution containing 10% by weight of initiator V50 are then added all at once. Immediately following this, 83.7 g of an aqueous solution containing 40 g of acrylic acid, 6.3 g of diethylene glycol diacrylate and 37.3 g of deionized water are continuously added over the course of 3 hours. Simultaneously, 60 g of a solution containing 7.6 g of a solution containing 10% by weight of initiator V50 and 52.4 g of deionized water are continuously added over the course of 3 hours. Once the addition of the reagents is complete, the reaction medium is maintained at 70° C. with stirring for 1 hour. The heating is then stopped and the reaction medium is allowed to reach ambient temperature before discharging it.

The solids content (115° C., 1 h) is 29.3 w/w %. The degree of acrylic acid conversion measured by HPLC is 100%. The average molar mass measured by GPC-MALLS is 65 220 g/mol.

EXAMPLE 5

Synthesis of an AA-Based Nanogel

The following are introduced, at ambient temperature, into a 250 ml three-necked round-bottomed flask surmounted by a reflux condenser and equipped with a magnetic stirrer:
  2.061 g of O-ethyl-S-(1-methoxycarbonyl ethyl)xanthate, $(CH_3CH(CO_2CH_3))S(C=S)OEt$, Rhodixan A1 manufactured by Rhodia
  9.3 g of deionized water
  9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 107.1 g of an aqueous solution containing 45 g of acrylic acid, 2.2 g of methylenebisacrylamide and 37.3 g of deionized water are continuously added over the course of 3 hours. Simultaneously, 60 g of a solution containing 13.1 g of a solution containing 10% by weight of initiator V50 and 46.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it.

The solids content (115° C., 1 h) is 30.0 w/w %. The degree of acrylic acid conversion measured by HPLC is 100%. The average molar mass measured by GPC-MALLS is 116 700 g/mol.

EXAMPLE 6

Synthesis of an AA-Based Nanogel

The following are introduced, at ambient temperature, into a 250 ml three-necked round-bottomed flask surmounted by a reflux condenser and equipped with a magnetic stirrer:
  2.061 g of O-ethyl-S-(1-methoxycarbonyl ethyl)xanthate, $(CH_3CH(CO_2CH_3))S(C=S)OEt$, Rhodixan A1 manufactured by Rhodia
  9.3 g of deionized water
  9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 84.3 g of an aqueous solution containing 45 g of acrylic acid, 2.0 g of methylenebisacrylamide and 37.3 g of deionized water are continuously added over the course of 3 hours. Simultaneously, 60 g of a solution containing 13.1 g of a solution containing 10% by weight of initiator V50 and 46.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it.

The solids content (115° C., 1 h) is 30.0 w/w %. The degree of acrylic acid conversion measured by HPLC is 100%. The average molar mass measured by GPC-MALLS is 116 700 g/mol.

EXAMPLE 7

Synthesis of an AA-Based Nanogel

The following are introduced, at ambient temperature, into a 250 ml three-necked round-bottomed flask surmounted by a reflux condenser and equipped with a magnetic stirrer:
  2.061 g of O-ethyl-S-(1-methoxycarbonyl ethyl)xanthate, $(CH_3CH(CO_2CH_3))S(C=S)OEt$, Rhodixan A1 manufactured by Rhodia
  9.3 g of deionized water
  9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 84.3 g of an aqueous solution containing 45 g of acrylic acid, 5.5 g of diethylene glycol diacrylate, 0.5 g of methylenebisacrylamide and 43.6 g of deionized water are continuously added over the course of 3 hours. Simultaneously, 60 g of a solution containing 13.1 g of a solution containing 10% by weight of initiator V50 and 46.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it.

The solids content (115° C., 1 h) is 29.0 w/w %. The degree of acrylic acid conversion measured by HPLC is 100%. The average molar mass measured by GPC-MALLS is 31 280 g/mol.

EXAMPLE 8

Synthesis of a Nanogel Based on AA and on NaSS

The following are introduced, at ambient temperature, into a 250 ml three-necked round-bottomed flask surmounted by a reflux condenser and equipped with a magnetic stirrer:
  2.061 g of O-ethyl-S-(1-methoxycarbonyl ethyl)xanthate, $(CH_3CH(CO_2CH_3))S(C=S)OEt$, Rhodixan A1 manufactured by Rhodia
  9.3 g of deionized water
  9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 94.8 g of an aqueous solution containing 45 g of acrylic acid, 9.4 g of diethylene glycol diacrylate and 40.4 g of deionized water are continuously added over the course of 3 hours. Simultaneously, 50 g of a solution containing 13.1 g of a solution containing 10% by weight of initiator V50 and 36.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it and then adjusting the pH thereof to 3.4 with sodium hydroxide at 50 wt %. This medium is then concentrated under reduced pressure using a rotary evaporator, until a solid concentration of 49.8 wt % is obtained (115° C., 60 min). This solution is reintroduced into the three-necked reactor, and 9.9 g of NaSS are added thereto. The reaction medium is degassed under nitrogen bubbling for 30 minutes, then the nitrogen stream is maintained above the reaction medium while the polymerization is carried out. The reaction medium is brought to 70° C. with stirring.

8.7 g of a solution containing 10% by weight of initiator V50 are then added all at once. The solution is maintained at 70° C. for 6 hours with stirring and a further 8.7 g of a solution containing 10% by weight of initiator V50 are then added all at once. Once the addition of the reagents is complete, the reaction medium is maintained at 70° C. with stirring for 12 hours. The heating is then stopped and the reaction medium is allowed to reach ambient temperature before discharging it.

The solids content (115° C., 1 h) is 25.9 w/w %. The degree of acrylic acid conversion measured by HPLC is 100%. The average molar mass measured by GPC-MALLS is 105 000 g/mol.

EXAMPLE 9

Synthesis of a Nanogel Based on AA and on VPA—Ref 332

The following are introduced, at ambient temperature, into a 250 ml three-necked round-bottomed flask surmounted by a reflux condenser and equipped with a magnetic stirrer:
  2.061 g of O-ethyl-S-(1-methoxycarbonyl ethyl)xanthate, ($CH_3CH(CO_2CH_3)$)$S(C=S)OEt$, Rhodixan A1 manufactured by Rhodia
  9.3 g of deionized water
  9.3 g of ethanol.

The reaction medium is degassed under nitrogen bubbling for 30 minutes, then the nitrogen stream is maintained above the reaction medium while the polymerization is carried out.

The reaction medium is brought to 70° C. with stirring.

4.4 g of a solution containing 10% by weight of initiator V50 are then added all at once. Immediately following this, 84.8 g of an aqueous solution containing 45 g of acrylic acid, 9.4 g of diethylene glycol diacrylate and 30.4 g of deionized water are continuously added over the course of 3 hours. Simultaneously, 60 g of a solution containing 13.1 g of a solution containing 10% by weight of initiator V50 and 46.9 g of deionized water are continuously added over the course of 3 h. Once the addition of the reagents is complete, the reaction medium is maintained at 70° C. with stirring for 1 hour. The heating is then stopped and the reaction medium is allowed to reach ambient temperature before discharging it and then adjusting the pH thereof to 2.6 with sodium hydroxide at 50 wt %. This medium is then concentrated under reduced pressure using a rotary evaporator, until a solid concentration of 44.7 wt % is obtained (115° C., 60 min). This solution is reintroduced into the three-necked reactor, and 4.9 g of VPA are added thereto. The reaction medium is degassed under nitrogen bubbling for 30 minutes, then the nitrogen stream is maintained above the reaction medium while the polymerization is carried out. The reaction medium is brought to 70° C. with stirring.

8.7 g of a solution containing 10% by weight of initiator V50 are then added all at once. The solution is maintained at 70° C. for 6 hours with stirring and a further 8.7 g of a solution containing 10% by weight of initiator V50 are then added all at once. Once the addition of the reagents is complete, the reaction medium is maintained at 70° C. with stirring for 12 hours. The heating is then stopped and the reaction medium is allowed to reach ambient temperature before discharging it.

The solids content (115° C., 1 h) is 20.0 w/w %. The degree of acrylic acid conversion measured by HPLC is 100%. The average molar mass measured by GPC-MALLS is 72 270 g/mol.

Part 2: Properties of the Polymers Prepared

The properties of the polymers synthesized in the above examples were tested as follows:

EXAMPLE 10

Evaluation Under Static Conditions of the ($BaSO_4$) Scale Formation Inhibition Performance Levels The polymers prepared were evaluated under static conditions, according to the methodology known as the "Jar test" or "Bottle test", which consists in measuring the level of precipitating cation (calcium or barium) soluble after mixing of two incompatible waters in a flask, then evolution of the mixture without stirring for a given time, and measurement of the soluble cations by a spectroscopic method (ICP-AES). The experiments comprise a controlled test without inhibitor and tests in the presence of inhibitors.

This evaluation is carried out at 95° C. and pH 5.5 after mixing of two brines, one of which has the composition of formation water from the FORTIES field in the North Sea (contains barium) and the other of which has the composition of seawater (contains sulfate). The inhibitor is placed in the seawater. The inhibitor concentration is 15 ppm (of active material) relative to the final mixture.

The pH of the seawater solution containing the inhibitor is brought to approximately 5.5 with a sodium acetate/acetic acid buffer solution.

The compositions of the brines (FORTIES water and seawater) are the following:

FORTIES Water

| Ion | mg/l |
| --- | --- |
| $Na^+$ | 31 275 |
| $Ca^{2+}$ | 2000 |
| $Mg^{2+}$ | 739 |
| $K^+$ | 654 |
| $Ba^{2+}$ | 269 |
| $Sr^{2+}$ | 771 |

-continued

| salt | Salt (g/l) |
|---|---|
| NaCl | 79.50 |
| $CaCl_2 \cdot 2H_2O$ | 7.34 |
| $MgCl_2 \cdot 6H_2O$ | 6.18 |
| KCl | 1.25 |
| $BaCl_2 \cdot 2H_2O$ | 0.48 |
| $SrCl_2 \cdot 6H_2O$ | 2.35 |

Seawater

| Ion | mg/l |
|---|---|
| $Na^+$ | 10 890 |
| $Ca^{2+}$ | 428 |
| $Mg^{2+}$ | 1368 |
| $K^+$ | 460 |
| $SO_4^{2-}$ | 2690 |

| salt | Salt (g/l) |
|---|---|
| NaCl | 24.40 |
| $CaCl_2 \cdot 2H_2O$ | 1.57 |
| $MgCl_2 \cdot 6H_2O$ | 11.44 |
| KCl | 0.88 |
| $Na_2SO4$ | 3.97 |

100 ml of each of these waters are conditioned in polyethylene flasks.

After having equilibrated the temperature of the brines at 95° C. in an incubator, the content of the "FORTIES water" flask is poured into the flask containing the barium. Stirring is carried out manually, then the mixture is put back in the incubator at 95° C. for 2 h.

For each test series, two control tests are carried out:
- Min blank: this is a test without inhibitor, the barium ion content will be the minimum (maximum precipitation of $BaSO_4$).
- Max blank: this is a test without sulfate and without inhibitor, the seawater is replaced with purified water, the barium ion content will be the maximum, since there is no precipitation.

After the 2 hours of the tests, the flasks are removed from the incubator and a 5 ml sample is taken, and then diluted in 5 ml of a "soaking" solution, the composition of which is: 5000 ppm of KCL/1000 ppm of PVS (sodium Poly(Vinyl Sulfonate)) adjusted to pH 8-8.5 (with 0.01 N NaOH). A barium assay is carried out on these samples (ICP-AES) and the inhibition efficiency, expressed according to the formula below, is deduced therefrom.

$$\% \text{ efficiency} = \frac{[Ba^{2+}] - [Ba^{2+}]_{min}}{[Ba^{2+}]_{max} - [Ba^{2+}]_{min}} * 100$$

with $[Ba^{2+}]_{max}$=$Ba^{2+}$ concentration in the Max blank
$[Ba^{2+}]_{min}$=$Ba^{2+}$ concentration in the Min blank The table below groups together the performance levels obtained.

| inhibitor | % efficiency of $BaSO_4$ inhibition (15 ppm) | % efficiency of $BaSO_4$ inhibition (30 ppm) |
|---|---|---|
| Example 1 p-AA | 77 | 94 |
| Example 2 p-AA | 84 | 93 |
| Example 3 AA-DiEGDA nanogel | 43 | 56 |
| Example 4 AA-DiEGDA nanogel | 55 | 71 |
| Example 5 AA-MBA nanogel | 61 | 75 |
| Example 6 AA-MBA nanogel | 45 | — |
| Example 7 AA-MBA-DiEGDA nanogel | 73 | 72 |
| Example 8 AA/NaSS DiEGDA nanogel | 67 | 64 |
| Example 9 AAA/PA DiEGDA nanogel | 54 | 67 |

EXAMPLE 11

Release Capacity of the Nanogels Subjected to a Temperature Increase

This example illustrates the capacity of the nanogels according to the invention to release polymeric units when they are subjected to a temperature increase. Depending on the heat sensitivity of the crosslinking agents present in the nanogel, the release will, for a given temperature, be more or less rapid.

The aqueous solutions of nanogels resulting from the previous examples were tested under the following conditions.

The aqueous solutions are introduced into glass flasks, at their end-of-synthesis pH, and then degassed under nitrogen bubbling for 20 minutes. After the flasks have been closed, they are placed in an incubator for one week at constant temperature (75° C., 85° C. and 95° C.).

Samples are taken at regular time intervals and an analysis by the "Gel Permation Chromatography-Multi Angle Laser Light Scattering" (GPC-MALLS) method makes it possible to measure, on the samples, the weight-average molecular weight (Mw) of the species present.

The conditions used for the GPC-MALLS are the following:
- A set of Aquagel-OH Mixed (3*(150*7 5 mm)) columns stationary phase: styrene/divinylbenzene which has been crosslinked
- mobile phase: buffer solution at pH=7: 100% water, 100 mM NaCl, 25 mM $NaH_2PO_4$, 25 mM $Na_2HPO_4$, 100 ppm $NaN_3$
- an RI refractometric detector (Agilent 1100)
- a MALLS Mini Dawn light scattering detector Since the pH also has an effect on the rate of hydrolysis of the points of crosslinking and therefore on the rate of release of the polymeric species, the table below specifies the pH of each heat-treated nanogel solution and recalls the "weight"-average molar mass measured by GPC-MALLS.

| Product | Mw (kg/mol) | pH |
|---|---|---|
| Example 3 AA/DiEGDA | 144 | 2.1 |
| Example 7 AA/DiEGDA/MBA | 31 | 2.0 |
| Example 5 AA/MBA | 117 | 2.0 |
| Example 4: AA/DiEGDA | 65 | 2.0 |
| Example 8 AA/NaSS DiEGDA | 105 | 4.9 |
| Example 9: AAA/PA DiEGDA | 72 | 3.2 |

The tables below group together, for each starting nanogel and each sample, the "weight"-average molar mass values expressed in kg/mol. Also indicated, in the final column, is the "weight"-average molar mass corresponding to the non-crosslinked polymeric unit (examples 1 to 4).

Example 3

| | t = 0 | 6 h | 1 day | 2 days | 3 days | 7 days | 10 days | Linear polymer Example 1 |
|---|---|---|---|---|---|---|---|---|
| 95° C. | 144 | 85 | 32 | 21 | 18 | 11 | 12 | 5.2 |
| 85° C. | 144 | 79 | 85 | 35 | 27 | 19 | 17 | 5.2 |
| 75° C. | 144 | 69 | 55 | 43 | / | 35 | / | 5.2 |

Example 4

| | t = 0 | 6 h | 1 day | 2 days | 3 days | 4 days | 6 days | Linear polymer |
|---|---|---|---|---|---|---|---|---|
| 95° C. | 65 | 42 | 22 | 15 | 14 | / | / | 9.1 |
| 85° C. | 65 | 46 | 31 | 24 | 21 | 19 | | 9.1 |
| 75° C. | 65 | 52 | 36 | 32 | / | / | 30 | 9.1 |

Example 5

| | t = 0 | 6 h | 1 day | 2 days | 3 days | 4 days | 7 days | Linear polymer |
|---|---|---|---|---|---|---|---|---|
| 95° C. | 117 | 44 | 16 | 14 | / | / | / | 7.6 |
| 85° C. | 117 | 77 | 37 | 22 | 19 | 15 | 9 | 7.6 |
| 75° C. | 117 | 90 | 61 | 45 | / | 28 | 22 | 7.6 |

Example 7

| | t = 0 | 6 h | 1 day | 2 days | 3 days | 4 days | 7 days | Linear polymer |
|---|---|---|---|---|---|---|---|---|
| 95° C. | 31 | 24 | 14 | 12 | / | 10 | / | 7.5 |
| 85° C. | 31 | 29 | 22 | 16 | 14 | 11 | 9 | 7.5 |
| 75° C. | 31 | / | 28 | 24 | 21 | / | / | 7.5 |

Example 8

| | t = 0 | 6 h | 1 day | 2 days | 3 days | 4 days | 7 days | Linear polymer |
|---|---|---|---|---|---|---|---|---|
| 95° C. | 105 | 44 | 23 | 16 | 13 | 12 | 9 | 6.7 |
| 85° C. | 105 | 72 | 39 | 26 | 21 | 18 | / | 6.7 |
| 75° C. | 105 | 89 | 58 | 41 | 34 | 29 | / | 6.7 |

Example 9

| | t = 0 | 6 h | 1 day | 2 days | 3 days | 4 days | 7 days | Linear polymer Example 4 |
|---|---|---|---|---|---|---|---|---|
| 95° C. | 72 | 45 | 27 | 19 | 16 | / | / | 6.1 |
| 85° C. | 72 | 54 | 34 | 26 | / | 18 | 13 | 6.1 |
| 75° C. | 72 | 50 | 43 | 33 | / | | 21 | 6.1 |

EXAMPLE 12

Evaluation Under Static Conditions of the $BaSO_4$ Inhibition Performance Levels of the Nanogels After Thermal Aging at 150° C.

In this example, the inhibition efficiency of the nanogels was measured after a heat treatment, which once again demonstrates the release of the linear polymeric units, under the conditions hereinafter.

Solutions containing 10% by weight of nanogels in deionized water are prepared, the pH of these solutions is adjusted to 6. These solutions are introduced into Teflon chambers, and then degassed for 30 minutes under nitrogen bubbling. After these Teflon chambers have been closed, they are placed in a steel system, called a "Parr bomb", making it possible to work under hydrothermal conditions above 100° C.

These Parr bombs are placed in an incubator at 150° C. for 5 days.

At the end of this heat treatment, the nanogels are evaluated according to the procedure described in example 10 and the $BaSO_4$ inhibition performance levels thereof are thus evaluated.

The level of polymer in these "jar tests" is 15 ppm.

The table below groups together the performance levels before and after aging. These results illustrate the capacity of the nanogels to release the linear polymeric species since the performance level of the linear species is found after aging.

| inhibitor | % efficiency of $BaSO_4$ inhibition (15 ppm) before aging | % efficiency of $BaSO_4$ inhibition (15 ppm) after aging at 150° C. for 5 days |
|---|---|---|
| Example 1 linear pAA | 77 | 81 |
| Example 5 AA/MBA nanogel | 61 | 85 |
| Example 6 AA/MBA nanogel | 45 | 80 |

EXAMPLE 13

Adsorption on Alumina and Kaolinite

The clay used as adsorption support is kaolinite. Its specific surface area measured according to the nitrogen BET method is 12 m²/g.

The alumina used as adsorption support has a specific surface area of 200 m²/g measured according to the nitrogen BET method.

1 liter of brine is prepared, the composition of which for 1 liter is the following
  2.4 g of NaCl
  5.7 g of $MgCl_2.6H_2O$
  1.5 g of $CaCl_2.2H_2O$ A solution containing 1000 ppm of polymer or nanogel is prepared from this brine. The pH of these solutions is controlled: it is, after adsorption, 5.0 for the alumina support and 3.1 for the kaolinite support.

The solid and also 30 g of solution containing a variable concentration of polymer or nanogel are then placed in glass flasks. For the kaolinite, 2 g of solid are brought into contact with the 30 g of solution; for the alumina, 0.2 g of solid are brought into contact with the 30 g of solution.

The flasks containing the solid and the solution are closed and then stirred by hand and placed in an incubator at 85° C., in which they remain for approximately 15 hours.

After 15 hours of contacting, the supernatant is sampled hot, and the polymer concentration is measured on said supernatant by determining the amount of organic carbon by means of a TOC-meter (LabToc from Pollution & Process Monitoring). This level was also determined on the solutions before contacting.

The level of polymer or of nanogel adsorbed at the surface of the solid is deduced therefrom, through the difference.

The table below groups together the adsorptions measured, expressed in mg/g (mg of polymer or nanogel per g of solid); the $C_{ini}$ values represent the initial concentrations of polymer in the solution before adsorption, expressed in ppm.

| inhibitor | Amount Adsorbed (mg additive/ g of clay) | Amount Adsorbed (mg additive/ g of alumina) |
| --- | --- | --- |
| example 1 p-AA | 7.6 | 115 |
| example 2 p-AA (ref 303) | 5.3 | 133 |
| example 3 AA-DiEGDA nanogel | 9.3 | 114 |
| example 4 AA-DiEGDA nanogel | 8.6 | 124 |

The invention claimed is:

1. A composition comprising, in a solvent medium S, chemically crosslinked polymers P resulting from the radical copolymerization of a mixture of monomers including:
   structuring monomers comprising ethylenically unsaturated monomers m1, selected from monomers which induce the chemically crosslinked polymer P to have an effect of inhibiting organic and/or inorganic deposit formation; and
   polyethylenically unsaturated monomers m2, bearing at least one group which is cleavable between two ethylenic unsaturations, and
   a polymerization control agent, wherein the polymerization control agent comprises a thiocarbonylthio group —S(C=S)—, wherein the amount of control agent relative to the total amount of monomers (control agent)/(m1+m2) is between 0.1% and 10%; and
   where said polymers P are present in the solvent medium S in the form of dispersed objects having sizes of less than 100 nm,
   wherein the monomers m1 are selected from the group consisting of acrylic acid, sodium vinyl sulfonate, styrenesulfonic acid and vinylphosphonic acid;
   wherein the monomers m2 are acrylic esters, methacrylic esters, diallyl ethers or divinyl ethers of the following dihydric alcohols:
      1,2-ethanediol; 1,2-propanediol; 1,3-propanediol; 1,2-butanediol; 1,3-butanediol; 2,3-butanediol; 1,4-butanediol; but-2-ene-1,4-diol; 1,2-pentanediol; 1,5-pentanediol; diethylene glycol; triethylene glycol; tetraethylene glycol; dipropylene glycol; tripropylene glycol; tetrapropylene glycol; 3-thiapentane-1,5-diol;
      polyethylene glycols and/or polypropylene glycols; and polytetrahydrofurans, these polyols having a molecular weight of between 200 and 10 000;
      mixtures of two or more of these alcohols.

2. The composition as claimed in claim 1, which is prepared according to a process which comprises a step (E) in which the following are brought together:
   the ethylenically unsaturated monomers m1;
   the polyethylenically unsaturated monomers m2 bearing the cleavable function;
   a source of free radicals; and
   the polymerization control agent,
with a degree of crosslinking, defined by the molar ratio m2/(m1+m2), corresponding to the amount of monomers m2 relative to the total amount of monomers, of between 0.05% and 25%.

3. The composition as claimed in claim 1, wherein the polymers P are obtained via a radical polymerization of the monomers m1 and m2 carried out in solution.

4. The composition as claimed in claim 1, wherein the polymers P comprise cleavable groups, introduced via the use of the monomers m2, which are divalent groups selected from -ester-; -amide-; -ether-; -ether phosphate-; and/or -ether sulfate-groups.

5. The composition as claimed in claim 4, wherein the cleavable groups are ester or amide groups.

6. The composition as claimed in claim 1, wherein the polymers P are present in the form of objects having a radius of gyration of less than 100 nm.

7. The composition as claimed in claim 1, wherein the monomers m2 are diethylene glycol diacrylate (DiEGDA), wherein the polymers P comprise cleavable -ester-groups.

8. A composition comprising, in a solvent medium S, chemically crosslinked polymers P resulting from the radical copolymerization of a mixture of monomers including:
   structuring monomers comprising ethylenically unsaturated monomers m1, selected from monomers which induce the chemically crosslinked polymer P to have an effect of inhibiting organic and/or inorganic deposit formation, wherein the monomers m1 are selected from the group consisting of acrylic acid, sodium vinyl sulfonate, styrenesulfonic acid and vinylphosphonic acid; and
   polyethylenically unsaturated monomers m2, bearing at least one group which is cleavable between two ethylenic unsaturations, wherein the monomers m2 are selected from the group consisting of diethylene glycol diacrylate (DiEGDA) and N,N'-methylenebisacrylamide (MBA), and
   a polymerization control agent, wherein the polymerization control agent comprises a thiocarbonylthio group —S(C=S)—, wherein the amount of control agent relative to the total amount of monomers (control agent)/(m1+m2) is between 0.1% and 10%; and
   where said polymers P are present in the solvent medium S in the form of dispersed objects having sizes of less than 100 nm.

9. A method of using a composition as claimed in claim 1, comprising placing the composition into an underground formation containing oil to inhibit formation of inorganic or organic deposits in the underground formation in the context of an oil extraction.

10. The composition as claimed in claim 1, wherein the polymers are present in the solvent in the form of dispersed nanogels having a radius of gyration of 1 to 75 nm.

11. The composition as claimed in claim 1, wherein the polymers are present in the solvent in the form of dispersed nanogels having a radius of gyration of 1 to 50 nm.

12. The composition as claimed in claim 11, wherein the chemically crosslinked polymers P have a degree of crosslinking, defined by the molar ratio m2/(m1+m2), corresponding to the amount of monomers m2 relative to the total amount of monomers, of between 0.05% and 25%.

13. The composition of claim 12, wherein the control agent is O-ethyl-S-(1-methoxycarbonylethyl)xanthate ($CH_3CH(CO_2CH_3)$)$S(C=S)OEt$, and the polymers have chains of approximately the same size, wherein the monomers m2 are diethylene glycol diacrylate (DiEGDA), wherein the polymers P comprise cleavable -ester-groups.

14. The composition as claimed in claim 1, wherein the polymerization control agent comprises a compound of formula (I):

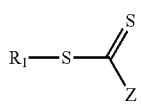

(I)

wherein Z is selected from the group consisting of H, Cl, an optionally substituted alkyl or optionally substituted aryl radical, an optionally substituted heterocycle, an optionally substituted alkylthio radical, an optionally substituted arylthio radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted carboxyl, acyloxy radical, an optionally substituted aroyloxy radical, an optionally substituted carbamoyl radical, a cyano radical, a dialkyl- or diaryl-phosphonato radical, a dialkyl-phosphinato or diaryl-phosphinato radical, or a polymer chain, and $R_1$ represents an optionally substituted alkyl, acyl, aryl, aralkyl, alkene or alkyne group, a saturated or unsaturated, aromatic, optionally substituted carbocycle or heterocycle, or a hydrophilic polymer chain, wherein the groups $R_1$ or Z, when they are substituted, may be substituted with optionally substituted phenyl groups, optionally substituted aromatic groups, saturated or unsaturated carbocycles, saturated or unsaturated heterocycles, or groups selected from alkoxycarbonyl or aryloxycarbonyl (—COOR), carboxyl (—COOH), acyloxy (—$O_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, alkali metal salts of carboxylic acids, alkali metal salts of sulfonic acid, polyethylene oxide, polypropylene oxide, quaternary ammonium salts, R representing an alkyl or aryl group, or a polymer chain; wherein the optionally substituted alkyl, acyl, aryl, aralkyl or alkyne groups generally contain 1 to 20 carbon atoms which are linear or branched and optionally substituted with oxygen atoms.

15. The composition of claim 1, wherein the control agent is O-ethyl-S-(1-methoxycarbonylethyl)xanthate ($CH_3CH(CO_2CH_3)$)$S(C=S)OEt$, and the polymers have chains of approximately the same size.

* * * * *